United States Patent [19]
Bamonte

[11] Patent Number: 5,417,273
[45] Date of Patent: May 23, 1995

[54] HOLDING APPARATUS FOR CREATING A FLEXIBLE WINDOW VENT AND METHOD

[76] Inventor: Arthur R. Bamonte, 2269 S. University Dr., Suite 102, Davie, Fla. 33324

[21] Appl. No.: 144,337

[22] Filed: Nov. 1, 1993

[51] Int. Cl.6 .................................................. B60J 1/00
[52] U.S. Cl. ..................... 160/368.1; 24/300; 296/146.2; 296/152
[58] Field of Search ............... 160/368.1, 354, 349.1, 160/349.2, 329, 402, 403, 405, 399, 389; 24/300, 301, 343; 296/146.2, 146.3, 146.14, 146.15, 146.16, 201, 200, 152

[56] References Cited

U.S. PATENT DOCUMENTS

| | | | |
|---|---|---|---|
| 238,323 | 3/1881 | Anderson | 24/300 |
| 382,287 | 5/1888 | Brandenburg . | |
| 416,540 | 12/1889 | Argerbright | 160/329 |
| 481,425 | 8/1892 | Robinson | 24/300 X |
| 1,456,093 | 5/1923 | Carlson . | |
| 1,458,353 | 6/1923 | Morse | 24/301 X |
| 1,528,712 | 3/1925 | Ward . | |
| 1,833,298 | 11/1931 | Oakey . | |
| 2,937,700 | 5/1960 | Gibbons | 160/354 |
| 2,991,524 | 7/1961 | Dobrikin | 24/73 |
| 3,231,950 | 2/1966 | Lummis | 24/73 |
| 3,328,064 | 6/1967 | Simon | 292/288 |
| 4,995,329 | 2/1991 | Kleine | 114/361 |
| 5,058,922 | 10/1991 | Long | 280/808 |

Primary Examiner—David M. Purol
Attorney, Agent, or Firm—Oltman and Flynn

[57] ABSTRACT

A window vent apparatus includes a window opening in a vehicle, the window opening having an opening edge, and an anchoring member adjacent the opening edge, a flexible window member having a perimeter edge and removably fastened with a fastener along the perimeter edge and around the opening edge, and at least two straps of different lengths, each having a window fastener at a first end for engaging the perimeter edge and an anchoring member fastener a second end for engaging the anchoring member. At least one of the straps is preferably elastic for creating tautness when installed on the window perimeter edge and the anchoring member, to hold the portion open. A method is also provided for creating a vent in a vehicle flexible window, where there is a window opening in the vehicle, the window opening having an opening edge, and an anchoring member adjacent the opening edge, a flexible window member having a perimeter edge and removably fastened with a fastener along the perimeter edge and around the opening edge, and at least two straps of different lengths and each having a window fastener at a first end for engaging the perimeter edge and an anchoring member fastener a second end for engaging the anchoring member, including the steps of unfastening a portion of the flexible vehicle window and pivoting the portion into an open position, fastening the anchoring member fastener to the anchoring member, and fastening the window fastener of one said strap to the portion perimeter edge.

7 Claims, 1 Drawing Sheet

HOLDING APPARATUS FOR CREATING A FLEXIBLE WINDOW VENT AND METHOD

BACKGROUND OF THE INVENTION

1. Field of the Invention

The present invention relates generally to the fields of vent window devices for motor vehicles and straps for securing items, and more specifically to a holding apparatus for use on a vehicle such as a post-1985 Jeep, having a flexible plastic side window and an anchoring projection secured along its perimeter edge by a zipper, series of snaps, or other fastener which can be progressively opened to release a portion such as a corner of the window, the holding apparatus including two elastic strap members, one longer and one shorter, both attached to a ring member for locking into an anchor projection below the window and a spring-biased clip, on each strap member for gripping the perimeter edge of the freed window portion to pull it down and double it over the remainder of the window to create a vent opening while releasably holding the freed portion against closure and against flapping in the air passing over the vehicle while the vehicle is moving, the longer strap member opening the window enough to create a smaller vent opening and the shorter strap member opening the window enough to create a larger vent opening.

2. Description of the Prior Art

There have long been straps with clips at their ends for securing various types of objects.

Brandenburg, U.S. Pat. No. 382,287, issued on May 1, 1888, discloses a carriage curtain fixture for holding a curtain taut and positioned across a carriage window. The fixture includes an elastic strap held in the sheath or hem of the curtain. A fastener is attached to each end of the strap, and a plate is folded over the fastener. A clasp with a looped end passes through the plate and fastener to bind them together. A problem with Brandenburg is that the fastener is relatively complex and expensive. Another problem is that use of the strap and fastener to hold open a venting portion of a flexible window is not disclosed.

Carlson, U.S. Pat. No. 1,456,093, issued on May 22, 1923, teaches a slack take-up device for electric iron cords. Axially divided tube segments fit around an electric cord at two points. A spring clip snaps over each tube segment to hold its divided portions in place around the cord, and each clip hooks to an end of a resilient member, to urge the two points toward each other. A problem with Carlson is that, once again, the use of the strap and clipped tube segments to hold open a venting portion of a flexible window is not taught. Another problem is that the divided tube segments are not configured to grip a flexible window edge.

Ward, U.S. Pat. No. 1,528,712, issued on Mar. 3, 1925, reveals a radiator cover sheet holder for automobiles. A flexible cover sheet is placed over a radiator to shield it from freezing temperatures. A rope is placed over the cover sheet and a fastening and tensioning device secures each end of the rope to a hood handle common on automobiles of that era. The fastening and tensioning device includes a tubular housing containing a coil spring, a shaft extending through one end of the housing and through the spring to attach to the far end of the spring. A line tied to a hook extends from the shaft. The other end of the housing is closed and a hook protrudes outwardly therefrom. The spring pulls the two hooks toward each other and thereby creates tension in the rope to hold the cover sheet in place. The same general structure and function are provided in Lummis, U.S. Pat. No. 3,231,950, issued on Feb. 1, 1966. Problems with Ward and Lummis are the same as those recited for Carlson.

Oakey, U.S. Pat. No. 1,833,298, issued on Nov. 24, 1931, discloses a sheet holder for beds. The holder includes an elongate strip of flexible material, designed to be folded over itself and stitched, thereby forming an elongate pocket. Buttons are spaced longitudinally on the opposite faces of the strip and adjacent to one edge of the strip. Grommets are spaced longitudinally on the remaining edge, and a reinforcing member extends through the pocket and is positioned between the buttons and grommet members. The buttons are adapted to engage button holes in a pair of sheets, and the grommets are adapted to engage fasteners for attaching the strip to a bed frame or mattress. A problem with Oakey is that it is complex, in addition to the problems identified for Carlson.

Dobrikin, U.S. Pat. No. 2,991,524, issued on Jul. 11, 1961, teaches a tarpaulin hold-down strap such as for use on beds of trucks. The strap includes an elastic tube having a pin element extending diametrically through each end. A hook element is secured to each pin element and extends outwardly beyond the opposite ends of the tube. A non-stretchable member longer than the tube is positioned within the tube and secured to the pins to limit the elastic extension of the tube. Several of these straps connect eyelets in the edges of the tarpaulin to the truck body. Again the problems of Carlson are presented.

Simon, U.S. Pat. No. 3,328,064, issued on Jun. 27, 1967, reveals a tying mechanism for securing the free end of a trunk lid to a trunk wall, for tying the lid down against an oversized load. The mechanism includes a rope or line member having a hook at each end for securing to the lid and trunk wall, and a slack gathering device. Simon presents the problems of Carlson.

Kleine, U.S. Pat. No. 4,995,329, issued on Feb. 26, 1991, teaches a boat cover sheet having loops periodically attached along its edges. A series of tie-down cords are also provided, one for each cover sheet loop. Each cord is extensible and has a ring at one end for engaging one of the loops and a hook at the other end for engaging the boat trailer frame. The problems of Carlson are again presented.

Long, U.S. Pat. No. 5,058,922, issued on Oct. 22, 1991, discloses a device for easing the pressure of a motor vehicle safety belt against a driver or passenger. The device includes a cord which has a suction cup at one end for releasably attaching to the windshield or a side window, and a clip at the other end for securing to the belt shoulder strap. The length of the cord is adjustable for the proper tension. The same problems are presented.

It is thus an object of the present invention to provide a two strap apparatus designed to hold a portion of a vehicle flexible window open to create an air vent of either of two different sizes.

It is another object of the present invention to provide such an apparatus which can be secured to the existing vehicle structure.

It is still another object of the present invention to provide such an apparatus which is easy to install and to remove and is reliable.

It is finally an object of the present invention to provide such an apparatus which is inexpensive to manufacture.

SUMMARY OF THE INVENTION

The present invention accomplishes the above-stated objectives, as well as others, as may be determined by a fair reading and interpretation of the entire specification.

A window vent apparatus is provided, including a window opening in a vehicle, the window opening having an opening edge, and an anchoring member adjacent the opening edge, a flexible window member having a perimeter edge and removably fastened with a fastener along the perimeter edge and around the opening edge, and at least two straps of different lengths, each having a window fastener at a first end for engaging the perimeter edge and an anchoring member fastener a second end for engaging the anchoring member. At least one of the straps is preferably elastic for creating tautness when installed on the window perimeter edge and the anchoring member, to hold the portion open. The window fasteners are preferably spring-biased clips for gripping the perimeter edge of the window. The anchor member is preferably a half door skin anchor and the anchoring member fastener is preferably a split ring member. A window vent apparatus is provided, including a window opening in a vehicle, the window opening having an opening edge, and art anchoring member adjacent the opening edge, a flexible window member having a perimeter edge and removably fastened with a fastener along the perimeter edge and around the opening edge, and a strap having a window fastener at a first end for engaging the perimeter edge and an anchoring member fastener a second end for engaging the anchoring member.

A method is also provided for creating a vent in a vehicle flexible window, where there is a window opening in the vehicle, the window opening having an opening edge, and an anchoring member adjacent the opening edge, a flexible window member having a perimeter edge and removably fastened with a fastener along the perimeter edge and around the opening edge, and at least two straps of different lengths and each having a window fastener at a first end for engaging the perimeter edge and an anchoring member fastener a second end for engaging the anchoring member, including the steps of unfastening a portion of the flexible vehicle window and pivoting the portion into an open position, fastening the anchoring member fastener to the anchoring member, and fastening the window fastener of one said strap to the portion perimeter edge.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
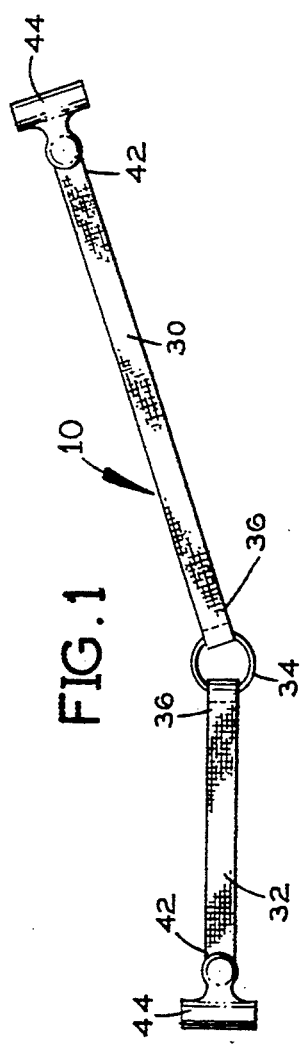
FIG. 1 is a side view of the preferred embodiment of the inventive holding apparatus having one longer strap and one shorter strap.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 3:
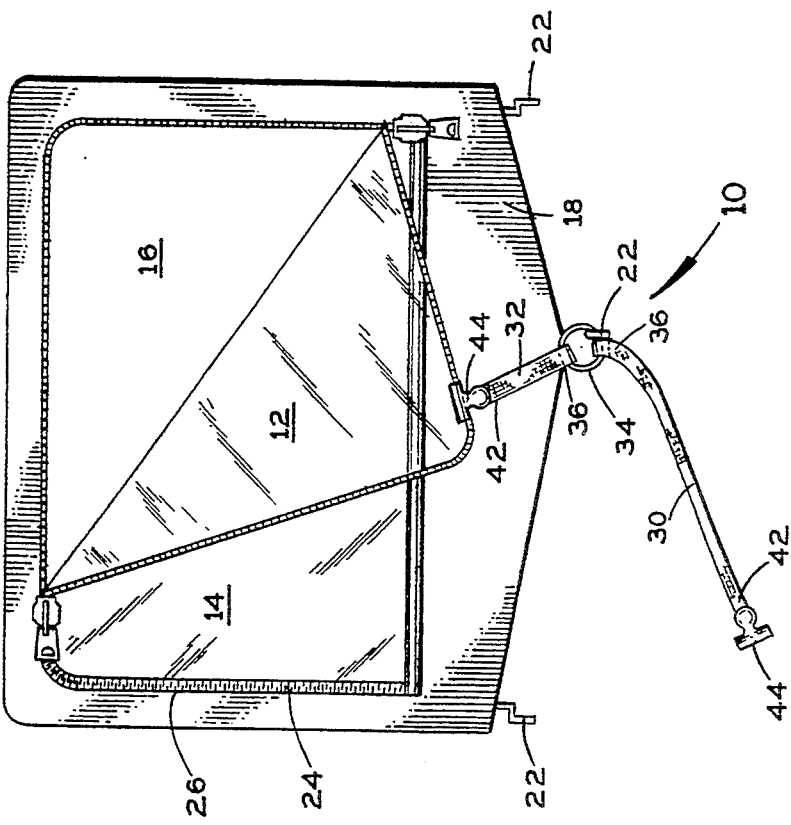
FIG. 3 is a side view of a vehicle flexible window having a larger vent opening formed at a corner of the window by the shorter strap of the inventive holding apparatus.
Figure 2:
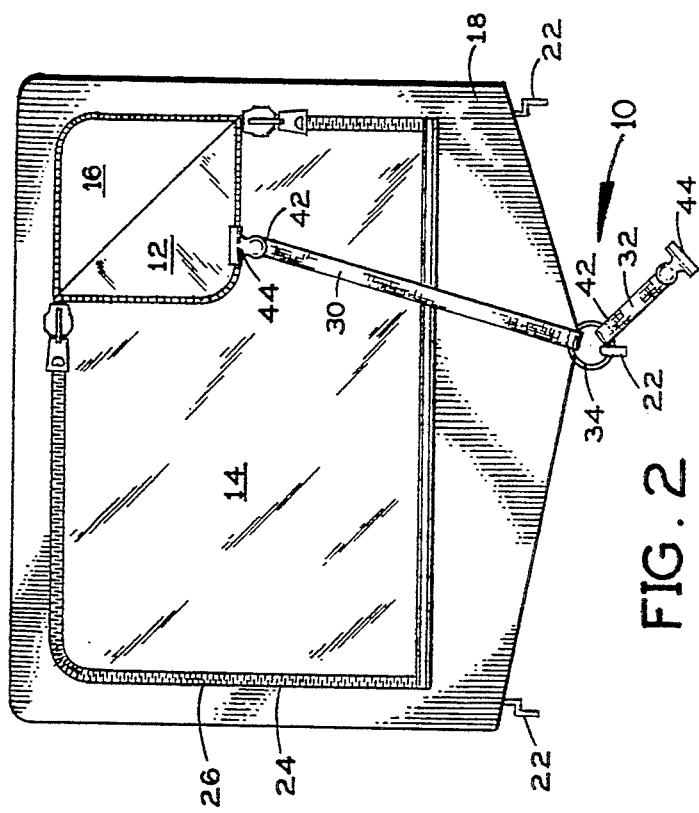
FIG. 2 is a side view of a vehicle flexible window having a smaller vent opening formed at a corner of the window by the longer strap of the inventive holding apparatus.

Referring to FIGS. 1-3, a holding apparatus 10 is disclosed for holding a portion 12 of a vehicle flexible window 14 doubled over window 14 in either of two open positions to function as air vent openings 16 of two different sizes. These windows 14 are of the type found on some post-1985 Jeeps TM, within what is known as a half door skin 18. The half door skin 18 is flexible and is secured with anchoring projections 22 along its bottom edge. Each window 14 is formed of a flexible plastic and fastened along its perimeter edge 24 by one or more perimeter fasteners 26 such as zippers, snap fasteners or other means. A window 14 can be progressively opened along perimeter edge 24 by progressively releasing perimeter fastener 26. Window 14 is opened only partly, so that portion 12 is freed to open and double over the remainder of window 14, creating vent opening 16. Holding apparatus 10 releasably secures portion 12 in this open position.

Holding apparatus 10 preferably includes a longer elastic strap member 30 and a shorter elastic member 32. Strap members 30 and 32 each have a fastening structure such as a ring member 34 at a first end 36 for locking into an anchoring projection 22 already on the vehicle below the window 14. See FIG. 1. The second ends 42 of strap members 30 and 32 include a spring-biased clip 44 for gripping the perimeter edge 24 of portion 12. Strap member 30 or 32 is then made taut, either by adjusting a buckle or preferably by an elasticity built into strap members 30 and 32.

Strap member 30 pulls portion 12 down and over the remainder of window 14 to create a smaller vent opening 16. See FIG. 2. In this way, portion 12 is releasably held against closure and against flapping in the air passing over the vehicle while the vehicle is moving. Strap member 32 pulls portion 12 farther down and over the remainder of window 14 than does strap member 30, to create a larger vent opening 16. See FIG. 3.

Method

In practicing the invention, the following method may be used. A portion 12 of a flexible vehicle window 14 is unfastened and opened, preferably at an upper window 14 corner. One end of a strap member 30 or 32 is fastened to an anchoring projection 22 on the vehicle and the other end to portion 20. Strap member 30 or 32 is then made taut.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A window vent apparatus, comprising:

a window opening in a vehicle, said window opening having an opening edge, and an anchoring member adjacent said opening edge, a flexible window member having a perimeter edge and removably fastened with fastener means along said perimeter edge and around said opening edge, at least two straps of different lengths, each said strap having window fastening means at a first end for engaging said perimeter edge and anchoring member fastening means at a second end for engaging said anchoring member.

2. A window vent apparatus according to claim 1, wherein at least one of said straps is elastic for creating tautness when installed on said window perimeter edge and said anchoring member, to hold a portion of said window member open.

3. A window vent apparatus according to claim 1, wherein said window fastening means is a spring-biased clip for gripping said perimeter edge of said window member.

4. A window vent apparatus according to claim 1, wherein said anchoring member is a half door skin anchor and wherein said anchoring member fastening means is a split ring member.

5. A window vent apparatus, comprising:

a window opening in a vehicle, said window opening having an opening edge, and an anchoring member adjacent said opening edge, a flexible window member having a perimeter edge and removably fastened with fastener means along said perimeter edge and around said opening edge, a strap having window fastening means at a first end for engaging said perimeter edge and anchoring member fastening means at a second end for engaging said anchoring member.

6. A window vent apparatus for use on a window opening in a vehicle, said window opening having an opening edge and an anchoring member adjacent said opening edge and a flexible window member having a perimeter edge and removably fastened with fastener means along said perimeter edge and around said opening edge, comprising:

at least two straps of different lengths, each said strap having window fastening means at a first end for engaging said perimeter edge and anchoring member fastening means at a second end for engaging said anchoring member.

7. A method of creating a vent in a vehicle flexible window, wherein comprising a window opening in the vehicle, said window opening having an opening edge, and an anchoring member adjacent said opening edge, a flexible window member having a perimeter edge and removably fastened with fastener means along said perimeter edge and around said opening edge, and at least two straps, each said strap having window fastening means at a first end for engaging said perimeter edge and anchoring member fastening means at a second end for engaging said anchoring member, comprising the steps of:

unfastening a portion of said flexible vehicle window and pivoting said portion into an open position, fastening said anchoring member fastening means to said anchoring member, fastening said window fastening means of one of said straps to said portion perimeter edge.

* * * * *